US011882917B1

(12) United States Patent
Moffitt

(10) Patent No.: US 11,882,917 B1
(45) **Date of Patent: *Jan. 30, 2024**

(54) COSMETIC PENCIL CAP WITH SHARPENER AND WASTE CONTAINER

(71) Applicant: MODERNMAVENZ, Salt Lake City, UT (US)

(72) Inventor: Jillianne R. Moffitt, Salt Lake City, UT (US)

(73) Assignee: MODERNMAVENZ, Salt Lake City, UT (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/562,473

(22) Filed: Dec. 27, 2021

Related U.S. Application Data

(63) Continuation-in-part of application No. 16/546,931, filed on Aug. 21, 2019, now Pat. No. 11,206,911.

(51) Int. Cl.
*A45D 40/20* (2006.01)
*B43K 29/06* (2006.01)
(Continued)

(52) U.S. Cl.
CPC .............. *A45D 40/20* (2013.01); *B43K 19/02* (2013.01); *B43K 23/10* (2013.01); *B43K 27/006* (2013.01);
(Continued)

(58) Field of Classification Search
CPC .. A45D 40/20; A45D 2040/202; B43K 27/04; B43K 29/06; B43L 23/00; B43L 23/08
See application file for complete search history.

(56) References Cited

U.S. PATENT DOCUMENTS 2,514,761 A 7/1950 Havnen
2,757,638 A 8/1956 Goldstein
(Continued)

FOREIGN PATENT DOCUMENTS

CN 1907174 A 2/2007
WO 96/35351 A1 11/1996

OTHER PUBLICATIONS

Final Office Action received for U.S. Appl. No. 16/546,931, dated May 3, 2021, 13 pages.
(Continued)

*Primary Examiner* — David P Angwin
*Assistant Examiner* — Bradley S Oliver
(74) *Attorney, Agent, or Firm* — Workman Nydegger

(57) ABSTRACT

A pencil device includes a body and a disposable cap. The disposable cap is selectively positionable so as to cover the first end of the body. The disposable cap includes a proximal end body portion having an opening, an opposite distal body portion having a storage cavity, and a built-in sharpener fixed between the proximal end body portion and the opposite distal body portion. The storage cavity is sealed for permanent storage of the shavings, A biasing member can be coupled to a side wall of the proximal end body portion configured to switch the disposable cap between a capping position and a sharpening position. Additional pressure is required to push the disposable cap from the capping position to the sharpening position. Upon release of the additional pressure, the disposable cap automatically returns to the capping position from the sharpening position.

18 Claims, 9 Drawing Sheets

(51) Int. Cl.

| | |
|---|---|
| ***B43K 27/04*** | (2006.01) |
| ***B43K 19/02*** | (2006.01) |
| ***B43K 23/10*** | (2006.01) |
| ***B43K 27/00*** | (2006.01) |

(52) U.S. Cl.
CPC .............. *B43K 27/04* (2013.01); *B43K 29/06* (2013.01); *A45D 2040/202* (2013.01)

(56) References Cited

U.S. PATENT DOCUMENTS

| | | | |
|---|---|---|---|
| 3,991,798 | A | 11/1976 | Grosjean |
| 4,406,315 | A | 9/1983 | Brickhouse |
| 4,513,798 | A | 4/1985 | Werner |
| 5,647,138 | A | 7/1997 | Tang et al. |
| 6,568,090 | B2 | 5/2003 | Sheffler et al. |
| 6,935,800 | B2 | 8/2005 | Hetzel |
| 7,832,108 | B2 | 11/2010 | Sterios-Primiani |
| 8,596,895 | B2 | 12/2013 | Schmidt et al. |
| 8,939,667 | B2 | 1/2015 | Pahlck et al. |
| 11,206,911 | B1 | 12/2021 | Moffitt |
| 2007/0031176 | A1 | 2/2007 | Gieux |

OTHER PUBLICATIONS

Non-Final Office Action received for U.S. Appl. No. 16/546,931, dated Oct. 16, 2020, 10 pages.

Notice of Allowance received for U.S. Appl. No. 16/546,931, dated Aug. 23, 2021, 8 pages.

COSMETIC PENCIL CAP WITH SHARPENER AND WASTE CONTAINER

CROSS-REFERENCE TO RELATED APPLICATION

This application is a continuation-in-part of U.S. application Ser. No. 16/546,931, filed Aug. 21, 2019, now U.S. Pat. No. 11,206,911, the entire contents of which are herein incorporated by reference.

BACKGROUND

Cosmetics pencils are used to apply cosmetics with precision and efficiency. Users will often carry cosmetics pencils with them so that they can apply or reapply their makeup whenever necessary. Some cosmetics pencils are provided with a cap to protect the tips of such pencils from dulling, breaking, or contacting undesired surfaces while they are being stored and/or transported in a bag, purse, pocket or the like. Cosmetics pencil caps can in particular protect the bag, purse or pocket from being damaged (e.g., by cosmetic smearing onto the purse, bag, etc.).

Dull cosmetics pencils can be difficult to use, e.g., they may not apply the cosmetic composition as uniformly or accurately as a sharpened pencil, or may scratch the user's eyelid, etc. In order to ensure that a pencil is appropriately sharpened for use, users will often carry a sharpener with them, although such sharpeners are easily lost or forgotten. Additionally, shavings from such cosmetics pencils are notorious for causing staining or other damage to a user's bag, purse pocket, clothing, etc.

While various cosmetics pencil sharpeners are available, there remains a continuing need for further improvements. For example, U.S. Pat. No. 4,513,798 to Luttgens describes a sharpener for a cosmetic pencil with a cap, although the chip collecting cap is required to be removable from the blade supporting body, and includes a specifically configured side edge of the sharpener that scrapes debris from the interior of the removable cap as the cap is removed. As such, the functionality of Luttgens relies on the cap being removable. As this cap removability is an important, even critical feature in Luttgens, one would not modify Luttgens to instead permanently fix the chip collecting cap in place, so that it could not be emptied.

While U.S. Pat. No. 3,991,798 to Grosjean describes an expendable sharpening device which is simply thrown away once it becomes full, the device proposed in Grosjean requires separate upper and lower units, with a rotatable connection therebetween, including a gasket located between the upper and lower units (col. 1 lines 16-18 and 31-33). In addition, the Grosjean device is not portable during use, configured for placement within a cap of a cosmetic pencil, but requires the inclusion of mounting structure for mounting the sharpening device to a table or similar stationary device.

U.S. Pat. No. 7,832,108 to Sterios-Primiani describes a pencil sharpener cap, but a critical feature of such device is that the size of the pencil shavings compartment necessarily adjusts to be larger, as the pencil is used up, and that the overall combined length of the pencil and sharpening cap remains constant as the pencil length decreases due to sharpening.

Each of the above devices require features that are critical to the function of the described device, which are incompatible with one or more features that are necessary to that of the present device, which is configured to be even simpler than that of Grosjean (no separate upper and lower units that are rotatable with one another, with any gasket therebetween). No outer wall or sharpening surface is included that is required to be flexible (which results in a more complex construction in Grosjean). Rather, in the present device, the sharpening surface is simple, and rigid. No mounting structure is provided, as in some of the above devices for mounting to a table or the like. Rather, the present device is entirely contained within a small portable cosmetic pencil cap, that is simple in construction so as to not change position or size as the pencil is sharpened, and which cannot be removed from the sharpener (i.e., the shavings are never released, but the entire cap and any remaining pencil are thrown out in their entirety once the cap is full). Ensuring that the cap cannot be removed ensures that no spilling or associated staining caused by such spills can ever occur.

SUMMARY

In one aspect, the present invention is directed to a pencil (e.g., cosmetic pencil or otherwise) with a disposable cap. The disposable cap has a built-in sharpener which is configured to permanently capture and store shavings produced as the pencil is sharpened. Therefore, the cap ensures that neither the exposed interior pigment of the pencil or the pencil shavings smear or otherwise damage a user's bag, purse, pocket or the like. The built-in sharpener is particularly advantageous because the user is much less likely to forget or misplace the sharpener since it is built into the cap, which will typically remain in place over the tip of the pencil when the pencil is not in use. Therefore, the user will be able to sharpen the pencil whenever the need arises, without having to worry about disposing of the shavings. No mounting structure is provided or required, as in Grosjean, which increases complexity of the device, and interferes with portability. The lack of mounting structure (e.g., for mounting to a table or the like), and the fact that the present cap cannot be opened or emptied are important, even critical features of the present embodiments.

An embodiment of the present invention is directed to a pencil device which comprises a body and a disposable cap. The body may include an exterior casing and an interior pigment which is surrounded by the exterior casing. The body may include a first end where the interior pigment is exposed. The body also includes a second end, which is opposite to the first end, and where the pigment may be surrounded by the exterior casing. In some embodiments, the pigment may also be exposed at the second end. The disposable cap can be selectively positioned over the first end of the body to cover the exposed pigment at the first end. In an embodiment, the cap may be a separate piece, completely removable from the pencil. In another embodiment, the cap could be tethered or otherwise attached to the pencil, to prevent its complete separation and loss. In any case, the storage cavity of the cap where shavings are stored cannot be opened or emptied.

The disposable cap includes a built-in sharpener and an opening in an interior of the cap, which opens into an internal storage cavity. The opening is aligned with an outlet from the built-in sharpener. Therefore, when the built-in sharpener produces shavings of the exterior casing and/or the pigment core of the body during sharpening, the shavings are received into the opening in the interior of the cap, which leads to the storage cavity where the shavings are permanently stored (i.e., the storage cavity is not configured for emptying, and is configured to prevent escape of any stored shavings). Such opening and storage cavity may be configured to accept only one-way conveyance of the shavings. They are received through the opening into the storage cavity, but are trapped therein, and not able to exit the cap again (which may otherwise result in smearing of pigment and/or other damage to a purse or other container in which the pencil and cap is stored). When the body of the pencil device has been depleted by use and sharpening (i.e., it's short and stubby), the cap and the stored shavings can be thrown away with any remaining small stubby body portion of the pencil.

In an embodiment, the device may be configured as a disposable cosmetic pencil, although it will be appreciated that other pencils may also benefit from the features described herein. In an embodiment, such a pencil may include a cylindrical body and a disposable cap. The cylindrical body may include an exterior casing (e.g., cylindrical) and an interior cosmetic or other pigment which is surround by the exterior casing. The body includes a first end where the interior pigment is exposed and a second opposite end where the pigment may not be exposed. The disposable cap includes a built-in sharpener and an opening in the interior of the cap. The opening is aligned with an outlet from the built-in sharpener and leads to a storage cavity for the permanent storage of shavings generated by sharpening the pencil. The storage cavity is configured to hold all shavings produced by the device throughout the device's lifespan. Additionally, it is not possible to empty or remove the shavings from the storage cavity. Therefore, after the device's lifespan, the any remaining short stubby portion of the pencil body is disposed of, along with the disposable cap (e.g., filled with shavings). Unlike Sterios-Primiani, it is important (even critical) that the size and location of the shavings compartment is fixed, rather than adjustable, to ensure a very high degree of simplicity to the device. Similarly, unlike Grosjean, it is important (even critical) that the sharpener cap not include mounting structure for mounting to a table or similar surface. Rather, the sharpener cap is simply positionable over the end of the pencil. Such ensures the necessary very high degree of simplicity to the device.

In an embodiment, the disposable cap can be positioned on the first end of the pencil device in two different positions, a capping position and a sharpening position. When the cap is in the capping position, the first end of the body may not engage the built-in sharpener. Therefore, it is not possible to sharpen the first end of the body while the cap is in the capping position. In this position, the cap simply serves as a protective cap for the pencil tip. In contrast, when the cap is in the sharpening position, the first end does engage the built-in sharpener. Thus, the user can sharpen the first end of the body to a point. The user may move the pencil and cap from the first position to the second position by simply pressing the pencil body further into the cap. The cap may include a mechanism to provide a tactile and/or audible (e.g., click) feedback to the user, letting them know that a given position has been achieved.

Another embodiment of the present invention is direct to a pencil device which includes a body and two disposable caps, one over each end. The body may include an exterior casing and an interior pigment which is surround by the exterior casing. The body includes a first end and an opposite second end. The interior pigment may be exposed at both ends. Moreover, the pigment may change part-way (e.g., halfway) between the two ends of the body. Therefore, the user can access two different pigments using the same pencil. The pencil device may include a disposable cap for each end of the body. One or both caps may have a built-in sharpener and a storage cavity as described herein for permanent storage of shavings produced by sharpening the body. In an embodiment, one cap may include such a sharpener, and the other may simply serve as a protective cap (without any sharpener or storage cavity), allowing the user to interchange and use the caps, as needed.

In any such embodiments, it is important that the built-in sharpener and storage cavity be fixed in position (and size). For example, the sharpener if fixed in position between the distal end of the proximal end body portion (which includes an opening) and the proximal end of the opposite distal body portion (which includes the sealed storage cavity) of the disposable cap. The storage cavity does not change in size or position (as in Sterios-Primiani).

The present invention also includes methods of use, e.g., where a device such as those described above is provided, and the disposable cap is positioned over the first end in the sharpening position. The method includes sharpening the first end of the body so as to fill the storage cavity with shavings, and when the user desires to discard the pencil and cap, the remaining pencil body portion (e.g., short and stubby at this point) and the cap including the storage cavity filled, with the shavings sealed therein, are both disposed of, together.

Another embodiment may be directed to a disposable pencil cap that can be provided for use with a cosmetic pencil. Such a disposable cap may include (1) a proximal end body portion having an opening, (2) an opposite distal body portion having a storage cavity, (3) a built-in sharpener fixed between the proximal end body portion and the opposite distal body portion, and (4) a biasing member coupled to a sidewall of the proximal end body portion. The biasing member is configured to switch the disposable cap between a capping position and a sharpening position. Additional pressure is required to push the disposable cap from the capping position to the sharpening position. Upon release of the additional pressure, the disposable cap automatically returns to the capping position from the sharpening position. When the disposable cap is in the sharpening position, an end of the pencil is sharpened by rotatably twisting the body in relation to the disposable cap.

Features from any of the disclosed embodiments may be used in combination with one another, without limitation. In addition, these and other objects and features of the present invention will become more fully apparent from the following description and appended claims or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

I. Definitions

Figure 1:
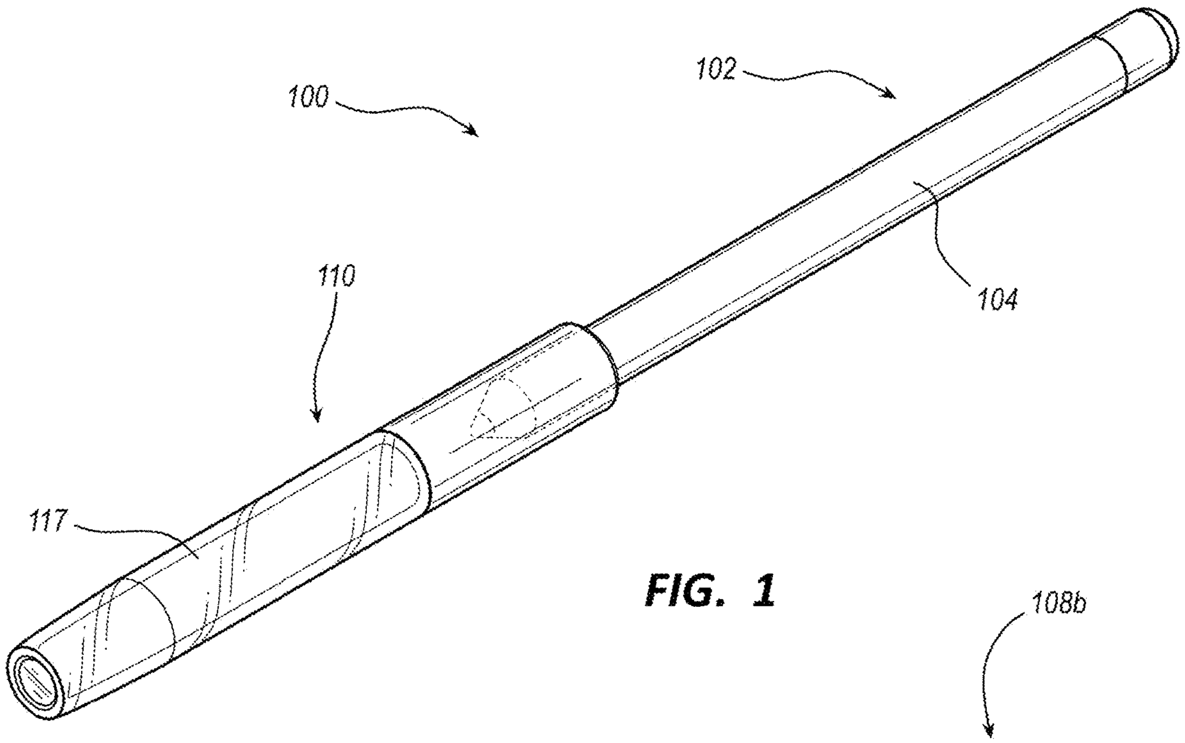
FIG. 1 is a perspective view showing an exemplary pencil device including a body and disposable cap with built-in sharpener, and storage cavity for permanent storage of shavings.

Any publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "layer" can include one, two or more layers.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. As such, all numbers expressing quantities as used in the specification and claims are to be understood as being modified in all instances by the term "about".

Some ranges may be disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

II. Introduction

The present invention is directed to cosmetic and other pencils that include a mechanism for sharpening the pencil tip, while preventing any need to dispose of shavings generated by such sharpening, and in a manner that prevents such generated shavings from escaping so as to stain or otherwise damage a purse, clothing, or other article that the pencil may come in contact with. For example, the invention may include a pencil with a disposable cap. The disposable cap includes a built-in sharpener which is configured to permanently capture shavings produced when the pencil is sharpened, sealing them within a permanent storage cavity, without allowing them to escape. Therefore, the cap ensures that the interior pigment or other coloring material included in shavings from the pencil cannot stain, smear or otherwise damage a user's bag, purse, pocket or the like. The built-in sharpener is particularly advantageous because the user is much less likely to forget or misplace such a sharpener, as it is not separate from the cap, but is integrated therein. For example, as such it is important (even critical) that the sharpener not include structure for mounting to a tabletop or similar surface, which increases complexity, and results in a sharpener that is more easily misplaced or forgotten, rather than taken in the user's purse, integrated or attached to the cosmetic pencil. Such a cap will typically remain in place over the tip of the pencil when the pencil is not in use, to protect the pencil tip. Therefore, the user will be able to sharpen the pencil whenever the need arises. In addition, because the cap is configured to capture all shavings generated by sharpening within the cap, and without any ability to empty the sharpener of such shavings, the user does not need to worry about disposing of the shavings, or worry about them inadvertently escaping from the sharpener or cap, which could otherwise result in staining or other damage to clothing, purses, or the like.

III. Exemplary Devices and Methods

Figure 2:
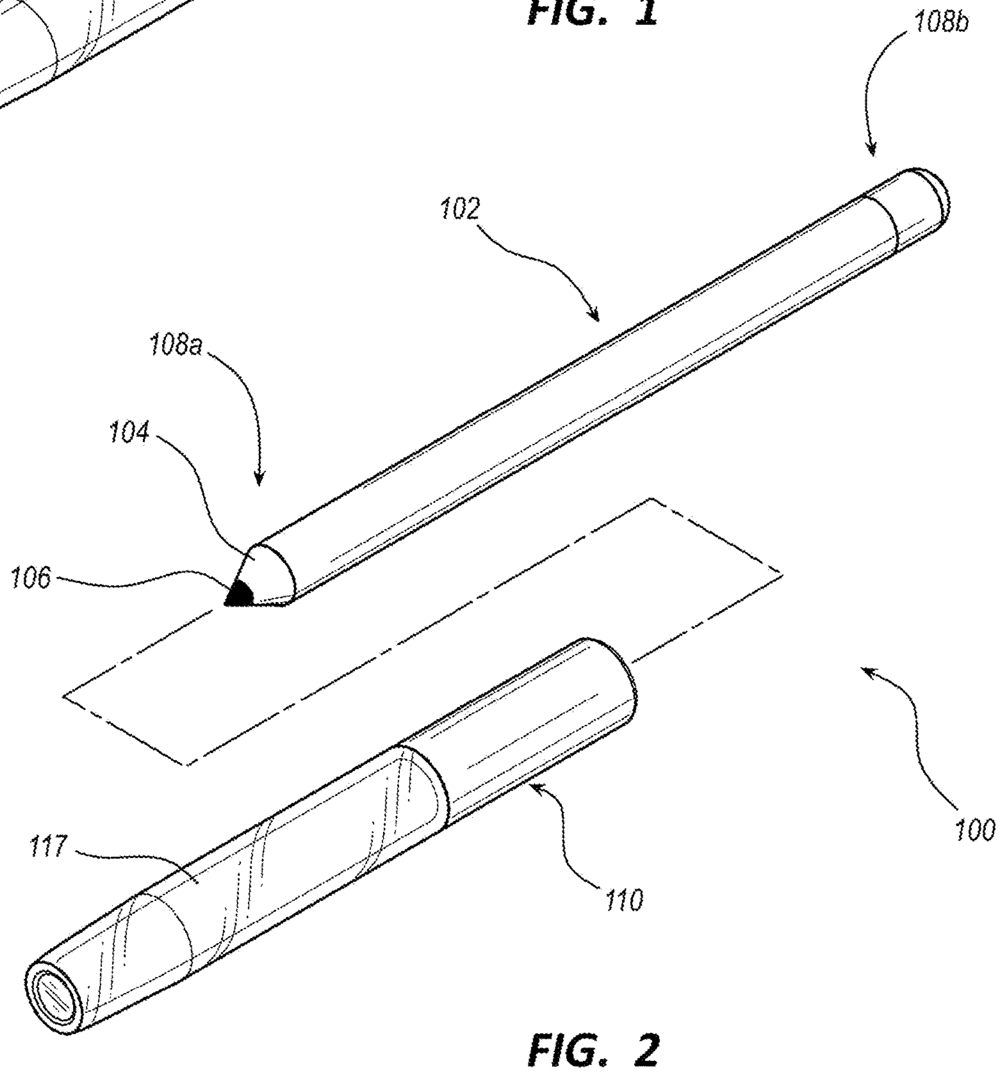
FIG. 2 is an exploded view of the pencil and cap of FIG. 1.
Figure 3:
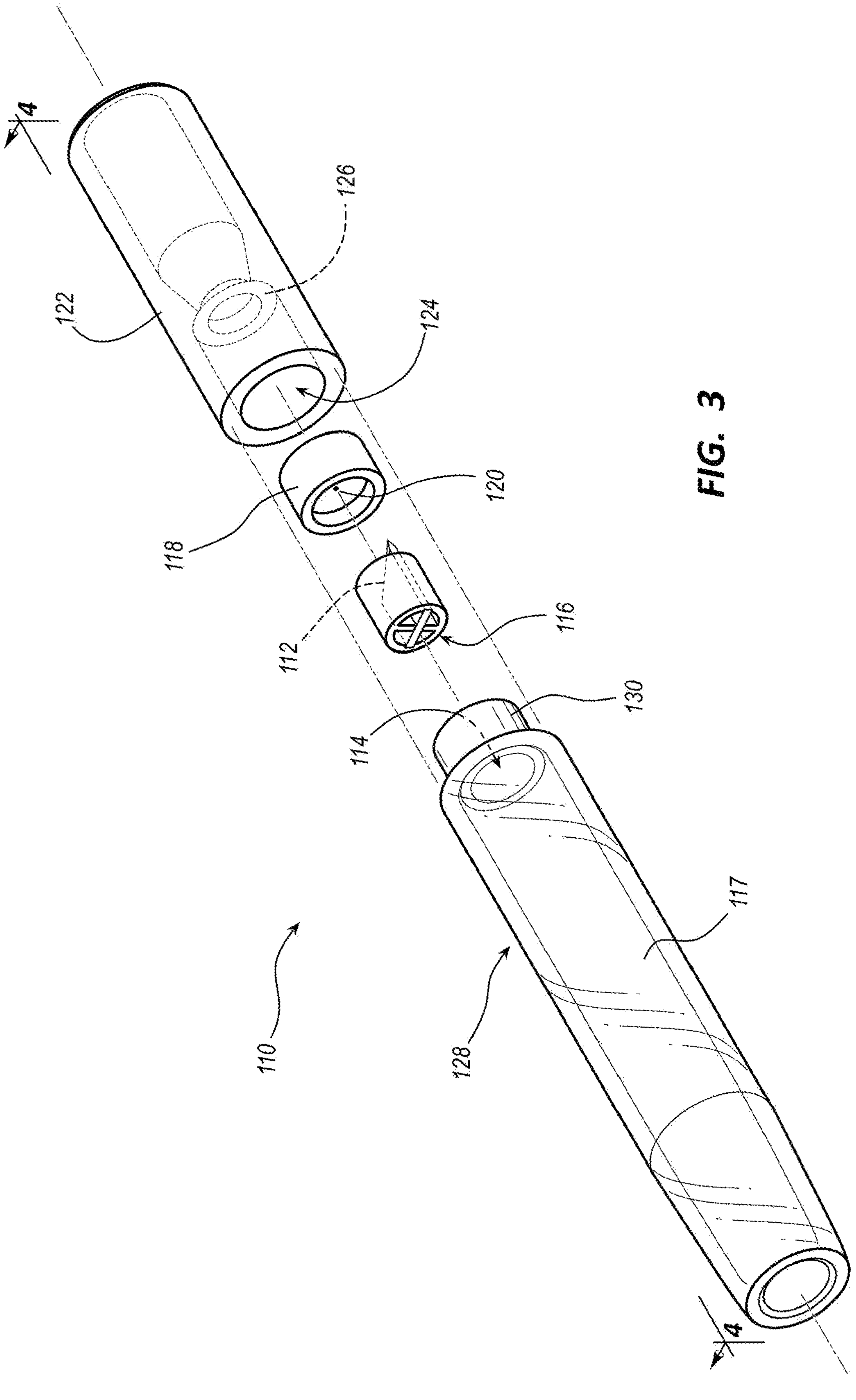
FIG. 3 is an exploded view showing components that may be provided in an exemplary cap.

FIGS. 1-3 illustrate an exemplary pencil device 100 including a body 102 having an exterior casing 104 and a core (e.g., pigment or other colorant or drawing material) 106. Such material will be referred to herein as pigment 106, although it is to be understood that such term is to be construed broadly, to encompass various colorants or drawing materials (e.g., graphite, colored compositions whether including pigments or otherwise, etc.). It will be apparent that a wide variety of materials may be suitable for use as core 106, depending on contemplated use. In a particularly contemplated embodiment, core 106 may be comprised of a cosmetic composition (e.g., an eyebrow pencil composition). Body 102 includes a first end **108*a* at which the pigment core 106 is exposed, and an opposite second end 108*b*. Device 100 is further shown as including a disposable cap 110 that is selectively positionable and removable over the first end 108*a*, so as to selectively cover the exposed pigment core 106. As seen in FIG. 3, cap 110 includes a sharpener 112 configured to sharpen tip 108*a* of pencil body 102. Cap 110 further includes an opening 114 in an interior of the cap 110, which is aligned with an outlet 116 of sharpener 112, for receiving shavings from the casing 104 and core 106 of body 102 as sharpening of end 108*a* occurs. As will be described in further detail below, generated shavings are received through opening 114, and into storage cavity 117, for permanent storage of such shavings, and eventual disposal with disposable cap 110. For example, cavity 117 fills with such shavings until such time as the pencil is substantially used up, e.g., at which time the cavity may be substantially filled, and the user may at that time simply discard any remaining short "stubby" portion of the pencil, along with the disposable cap 110**.

Cap 110 is specifically configured to not allow emptying of the shavings contents of storage cavity 117, but to rather accumulate and hold such shavings throughout the life of the disposable pencil and cap device 100, allowing the entire item to be thrown out once the cavity is substantially filled and the pencil has been substantially used up. In particular, there is no ability to somehow access cavity 117 and empty its contents, for reuse of the disposable cap. For example, reuse of existing sharpeners beyond use with a single pencil necessitates the ability to empty any storage container associated with such sharpeners, or to otherwise allow exit of shavings from the sharpener from the overall sharpening device, for disposal of such shavings, as in Luttgens. Such emptying or exit necessarily poses a risk of such shavings inadvertently spilling within a purse, pocket, or the like, staining or otherwise damaging such items. The present configurations thus eliminate or minimize the risk of such by providing for permanent storage of the generated shavings throughout the useful life of the pencil and cap, which are both disposed of after the useful life of a single pencil.

In FIG. 3, the storage cavity 117 is shown at the distal end of the cap 110, and is shown as being transparent or translucent, e.g., so as to allow a user to easily see how much of cavity 117 has been filled, versus how much remains empty still. In another embodiment, this portion of the cap 110 could alternatively be opaque.

Figure 6:
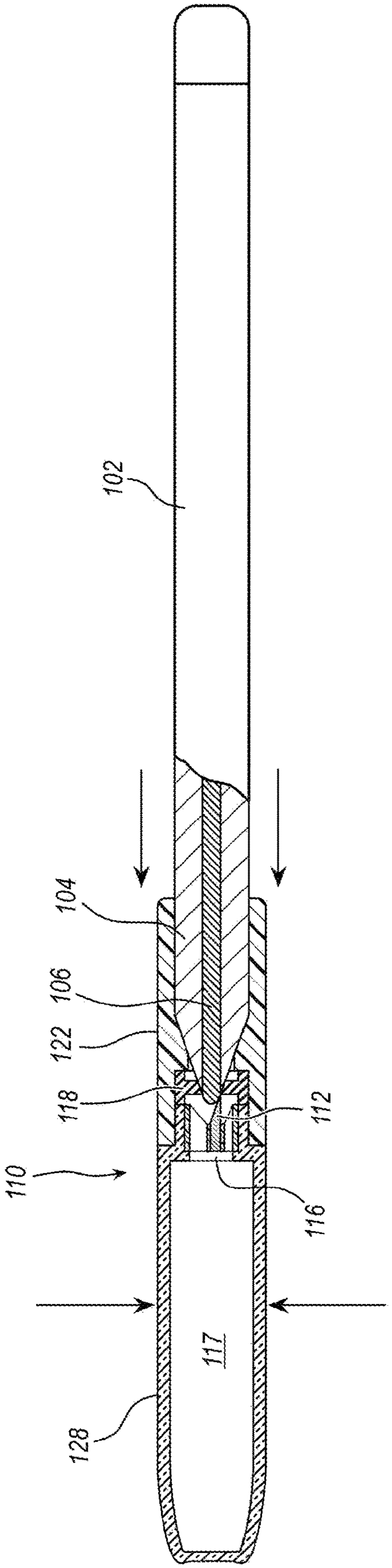
FIGS. 6-7 shows how the sharpener may be configured to sharpen the pencil tip, while collecting the shavings from such sharpening in a sealed storage cavity of the cap in a manner that prevents exit of such shavings from the cap, after entry therein.
Figure 7:
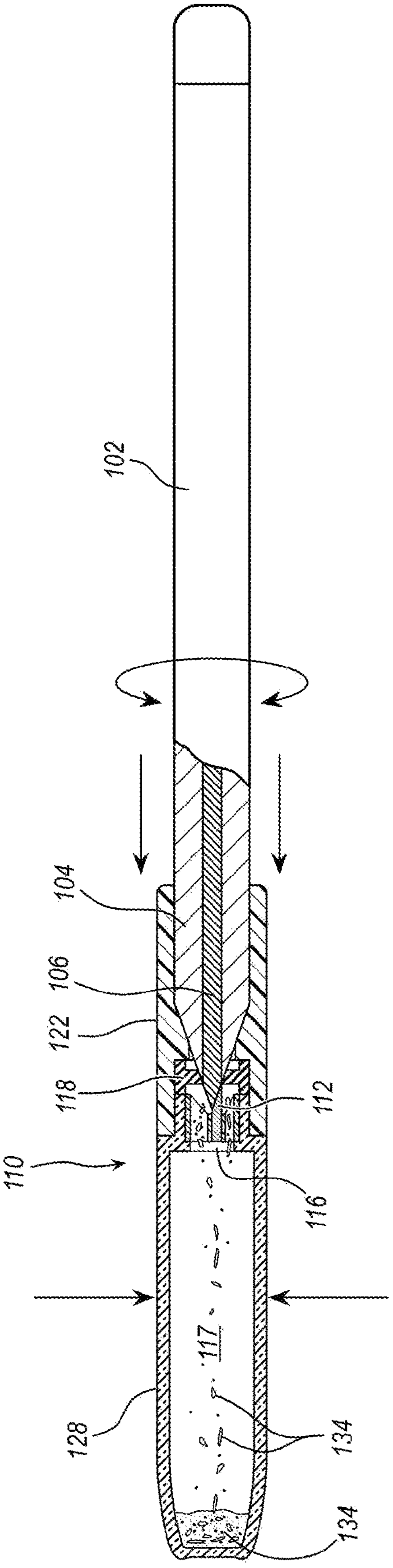

FIG. 3 further illustrates an elastomeric sealing valve 118, e.g., which may be formed of a suitable elastomeric material (e.g., silicone, a thermoplastic elastomer, rubber, or the like). Valve 118 is further shown as including a pinpoint opening 120 centered in valve 118, e.g., aligned with the longitudinal axis of the overall device 100 and body 102, so that the point of core 106 aligns with opening 120 when body 102 is pressed into cap 110. Such opening 120 may not actually present any actual opening (e.g., it may not include any actual measurable opening), due to the elastomeric nature of the material used for construction of the valve 118. In other words, such a pinpoint opening may simply present a cut, slit or similar opening through the material of such valve, but because of the elastomeric characteristics of such material, the opening is biased closed, unless and until such time as the pencil tip is inserted therein. Upon insertion of such pencil tip 108*a* therein, the material is able to flex aside, allowing the pencil body to enter therein, for sharpening, as shown in FIGS. 6-7. Even with pencil tip 108*a* inserted in such opening 120, the interior of cap 110 is still closed (i.e., there is no gap between such an inserted pencil tip 108*a* and the valve 118). While valve 118 may be flexible, the other structures of the device will typically be rigid, rather than flexible (e.g., differing from Grosjean, where the abrasive sharpening surface is flexible).

Figure 4:
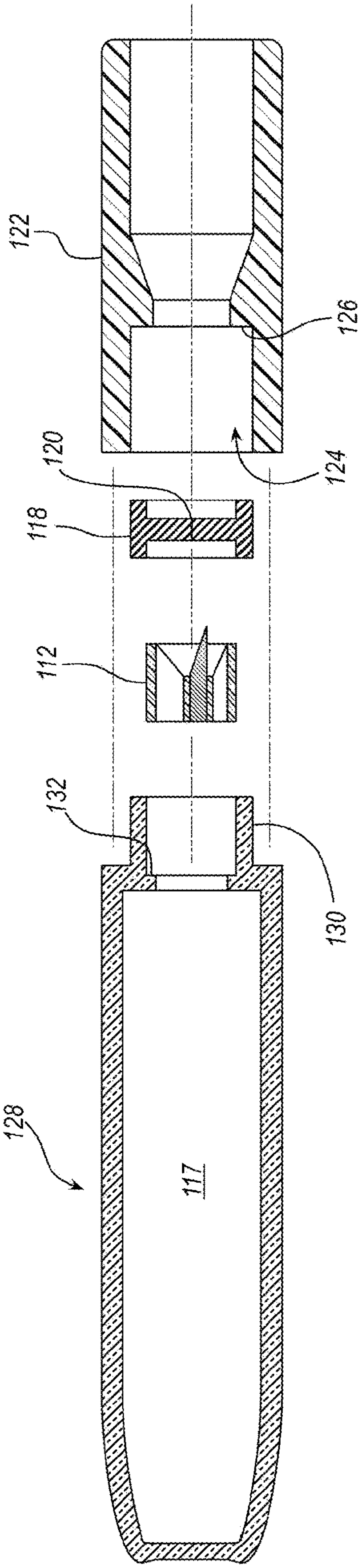
FIG. 4 is an exploded cross-sectional view showing the components of FIG. 3.
Figure 5:
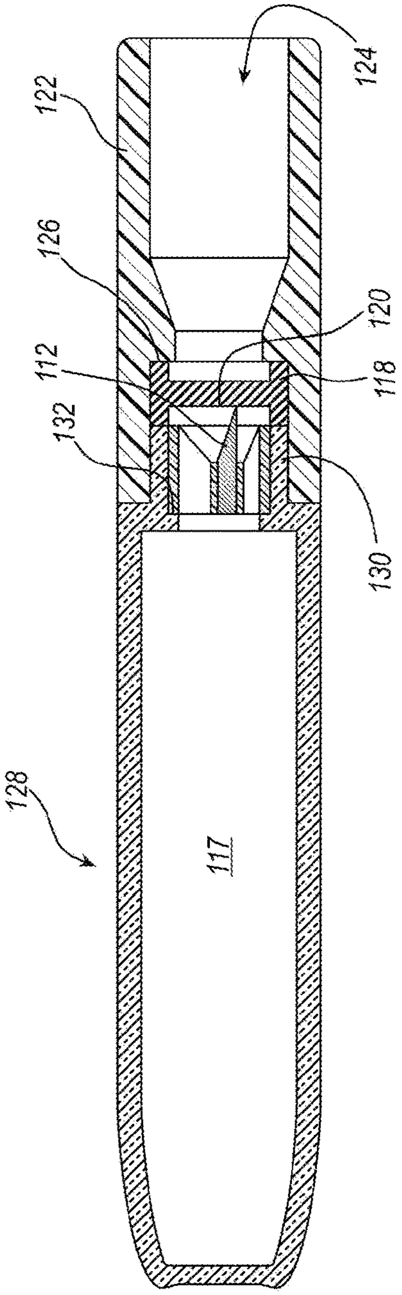
FIG. 5 is an assembled cross-sectional view of the assembly of FIG. 4.

While FIG. 3 shows the cap 110 exploded in perspective view, FIGS. 4 and 5 show the same cap structures in cross-section, exploded (FIG. 4) and assembled (FIG. 5). The cap 110 may also include a proximal end body portion 122, opposite distal body portion 128, defining storage cavity 117, for receiving a portion of body 102 adjacent to end 108*a*. In the illustrated configuration, proximal end body portion 122 may include an opening (e.g., at the distal end thereof) 124 into which one-way sealing valve 118 is inserted and seated against an internal shoulder 126 during assembly. Opening 124 may extend entirely through proximal end body portion 122, as shown, allowing insertion of the pencil body 102 through the opposite (proximal) end of such opening 124, allowing the end 108*a* of such pencil to approach and contact point 120 of valve 118. The distal body portion 128 which defines internal storage cavity 117 may also include a neck 130 configured for receipt into opening 124, which neck also is adjacent to an internal shoulder 132 (FIG. 5) against which a base of sharpener 112 may be seated. The sharpener 112 and one-way sealing valve 118 could be secured in the assembled configuration in any suitable manner, e.g., using an adhesive, friction fit, etc.

FIG. 6 shows that as force is applied pressing the pencil body 102 (see force arrows) into the open proximal end of cap 110 (into open proximal end body portion 122, through the proximal end of opening 124), the core 106 of pencil body 102 contacts the sealing valve 118, centered at initially closed opening 120, so that upon application is continued pressure, the initially closed opening 120 expands, dilating outward, so as to accommodate passage of a portion of distal tip 108*a* (e.g., at least the tip of core 106) therethrough. As shown in FIG. 7, by rotating pencil body 102 in such condition, the blade (e.g., rigid blade) of sharpener 112 shaves material from the distal tip (e.g., core 106 and/or surrounding casing 104). Because the opening 116 at the bottom of the base of sharpener 112 is open and aligned with storage cavity 117, shavings 134 fall though opening 116 as they are generated at sharpener 112. As shown in FIG. 7, such shavings 134 accumulate within storage cavity 117, and are not able to exit or otherwise escape therefrom, because of one-way sealing valve 118, which automatically closes once pencil tip 108*a* is removed therefrom. An additional benefit of such a configuration is that as the pencil body 102 is withdrawn from sealing valve 118, the freshly sharpened tip 108*a* is wiped clean of shaving dust and debris, which materials fall through the opening, and into storage container 117.

Figure 8:
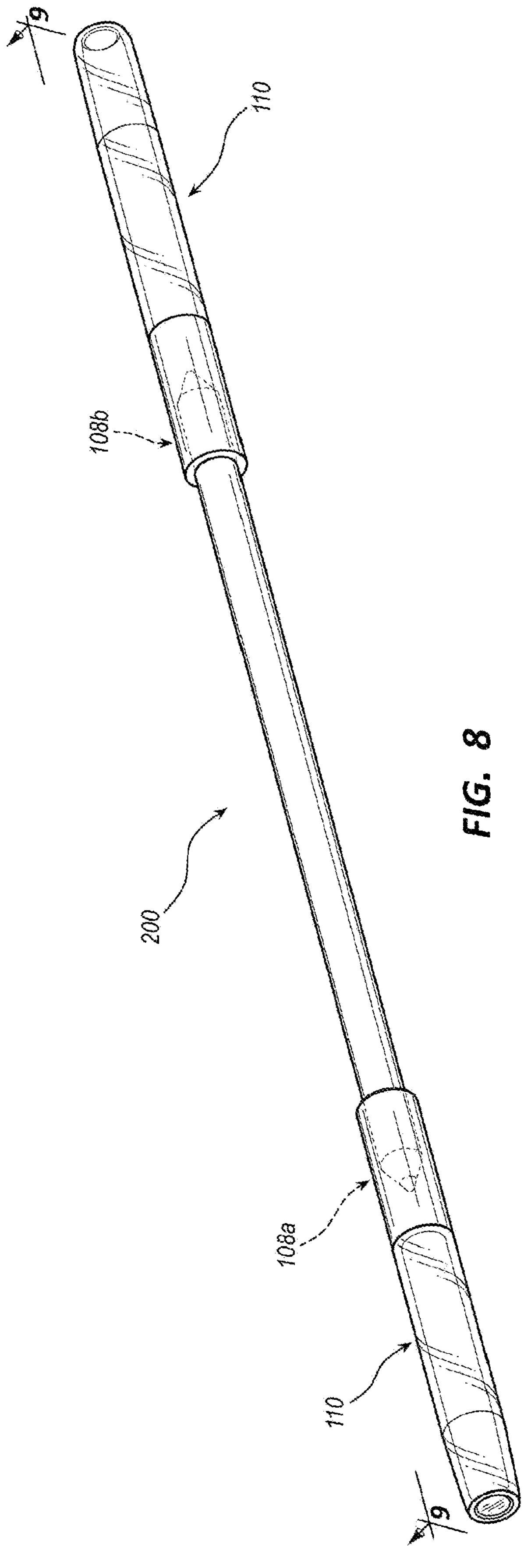
FIGS. 8-9 show an embodiment of a pencil that may include caps at both ends (e.g., different colored pigments provided at each end).
Figure 9:
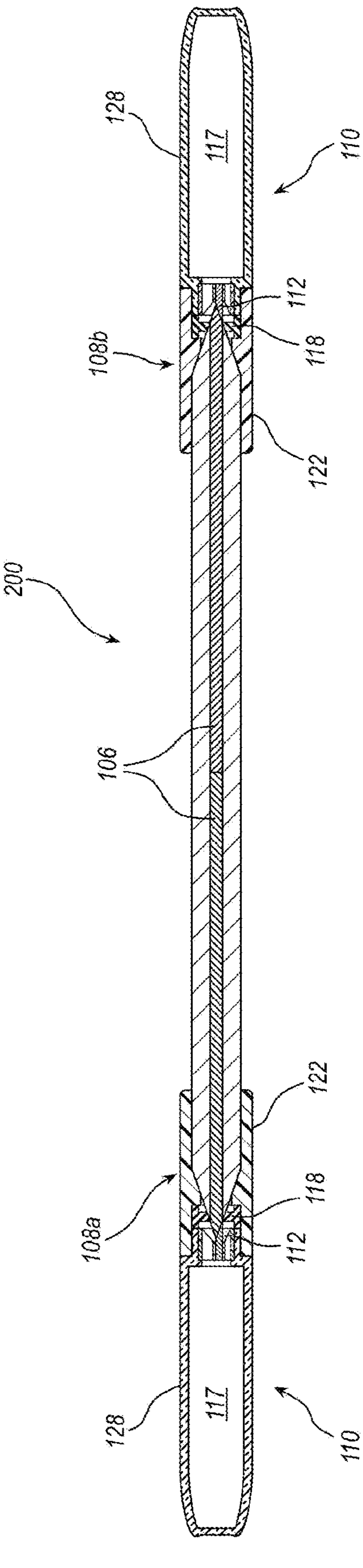

FIGS. 8 and 9 illustrate an embodiment 200 similar to the embodiment 100 already shown and described in conjunction with FIGS. 1-7, but which is shown as including two caps 110, over each of ends 108*a*, and 108*b*. FIG. 9 shows a cross-sectional view of such a configuration, showing both caps as being configured with internal sharpeners 112, and sealed storage cavities 117. It will be appreciated that in another embodiment, only one of the caps may include the built-in sharpener, storage cavity, etc., while the other cap may not necessarily include such features.

Figure 10:
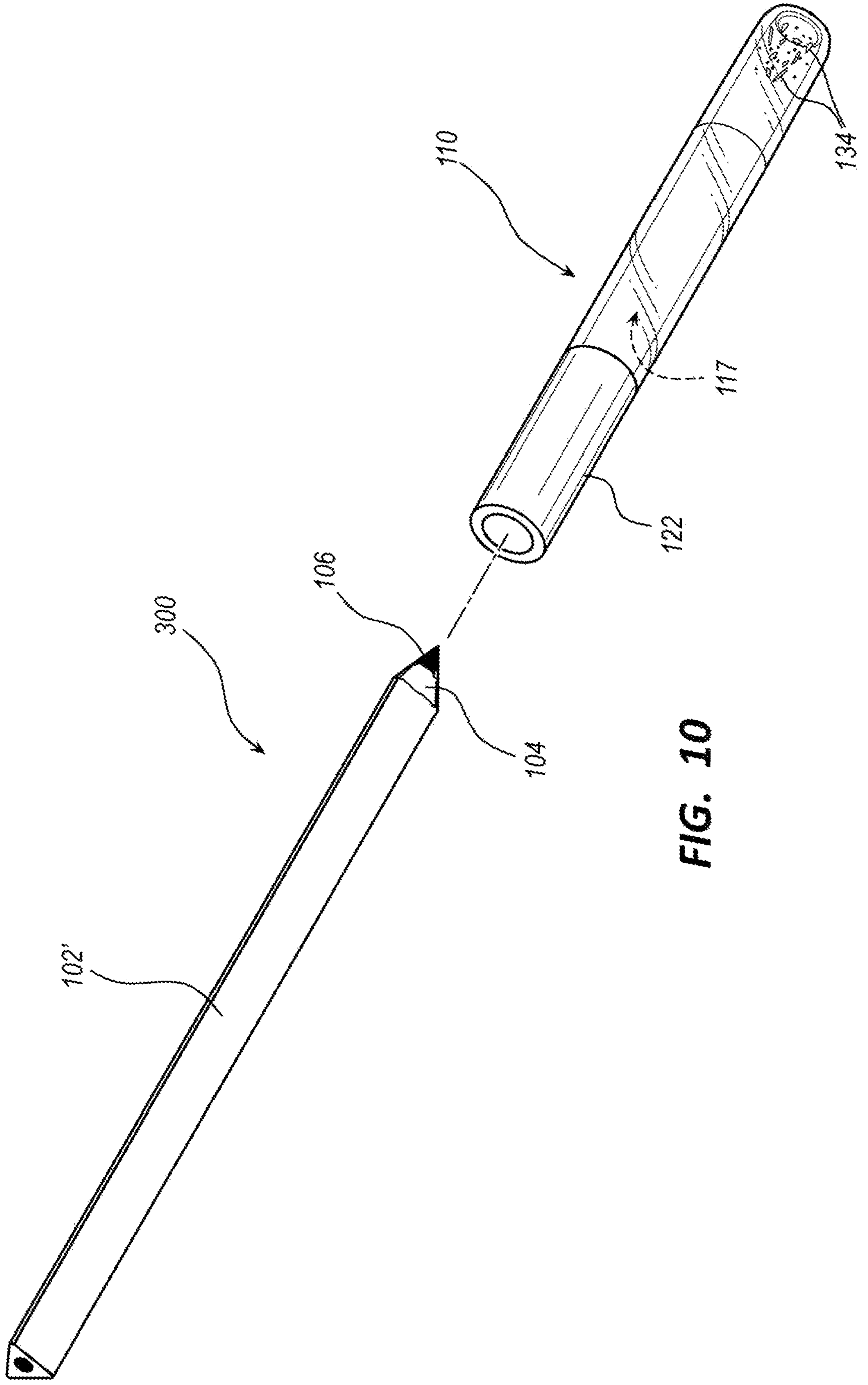
FIG. 10 shows how the body of the pencil device may be polygonally shaped, and yet still receivable within the sharpening cap.

FIG. 10 illustrates another embodiment 300 showing how the pencil body 102' may have a cross-sectional shape that is other than cylindrical (e.g., any of various polygonal shapes), while still being accommodated within cap 110, for protection and/or sharpening. While not illustrated, in an embodiment, the exterior of the cap could also have a polygonal cross section (while including a cylindrical interior, to allow rotation and sharpening of the pencil body therein). For example, the cap could include a triangular exterior cross sectional shape, matching that of the illustrated pencil body 102'.

Figure 11:
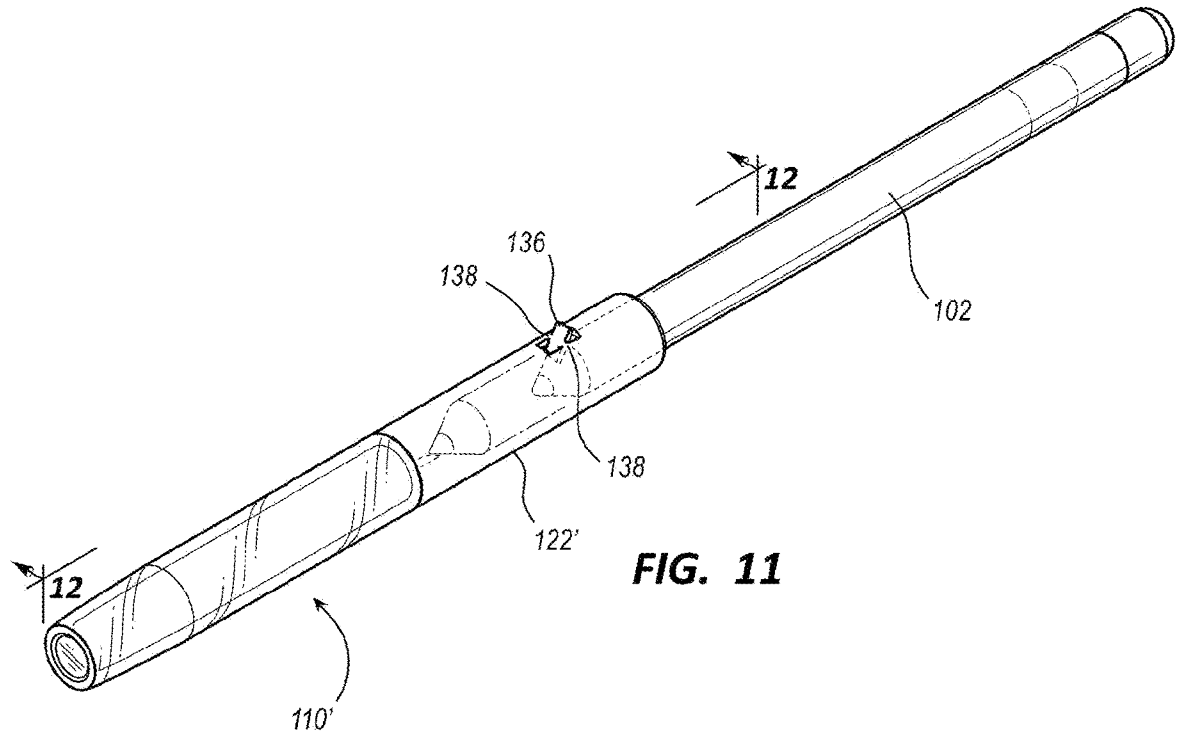
FIGS. 11-13 show how the cap may be configured to provide two positions, both a "capping position" where the tip is simply covered or capped, and a "sharpening position", where the tip is advanced further into the cap, engaging with the sharpener of the cap, in which position the tip can be sharpened.
Figure 12:
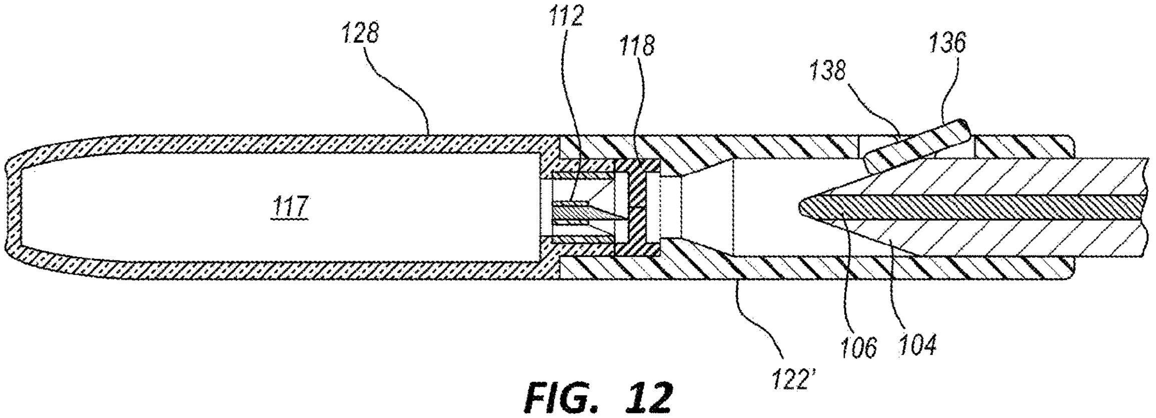
Figure 13:
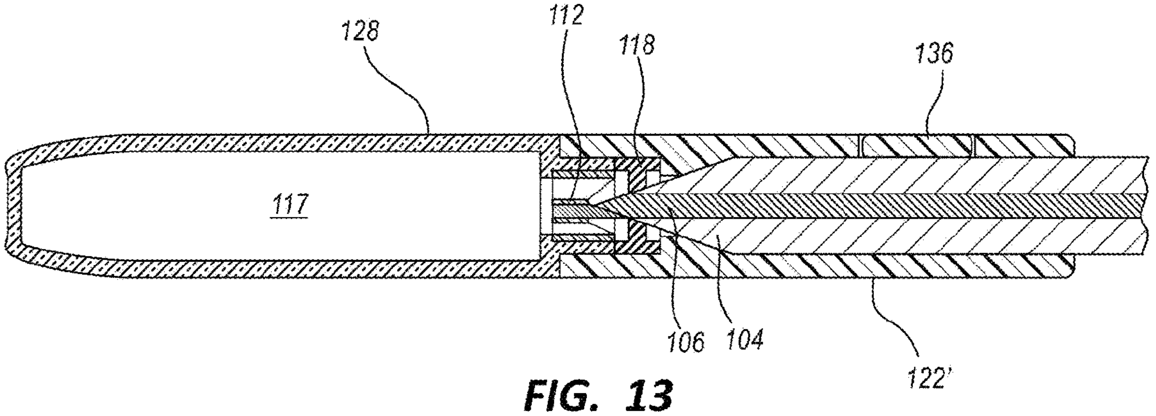
Figure 14:
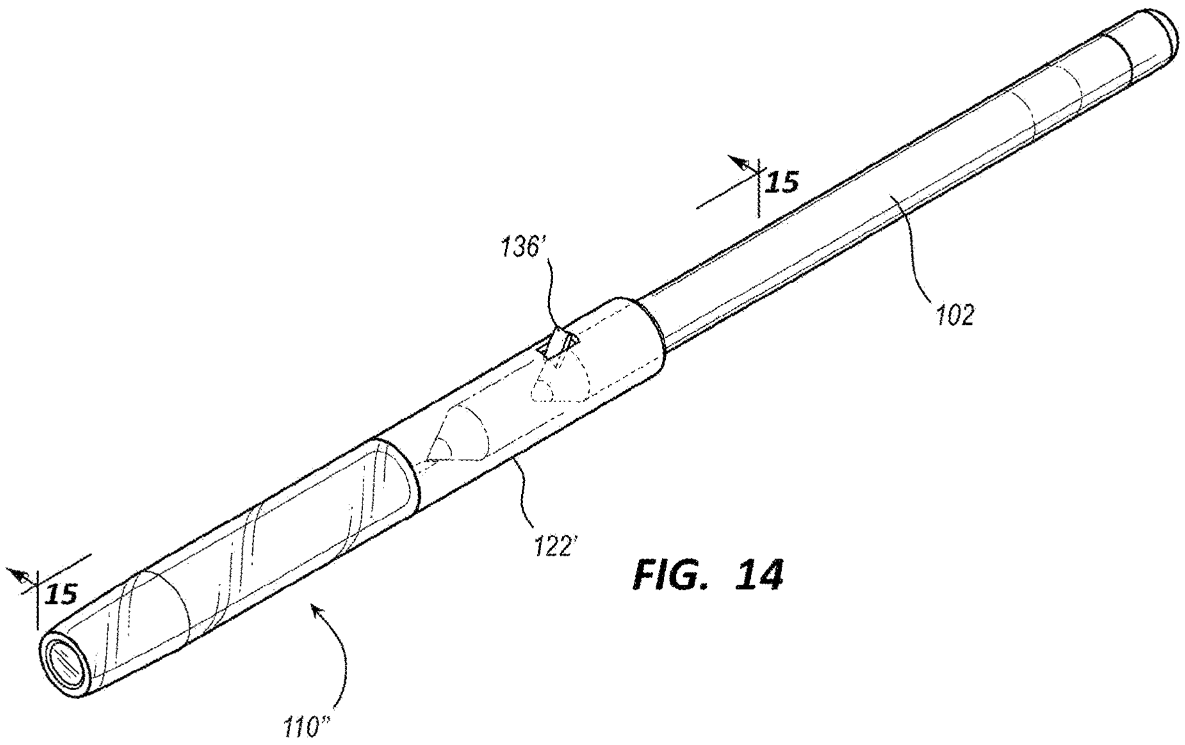
FIGS. 14-18 show additional configurations where the cap provides both "capping" and "sharpening" positions.
Figure 15:
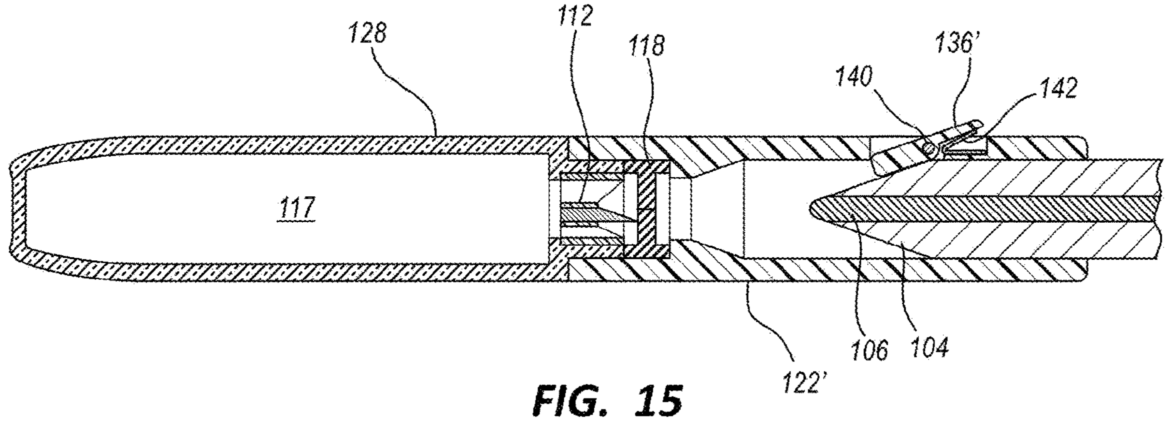
Figure 16:
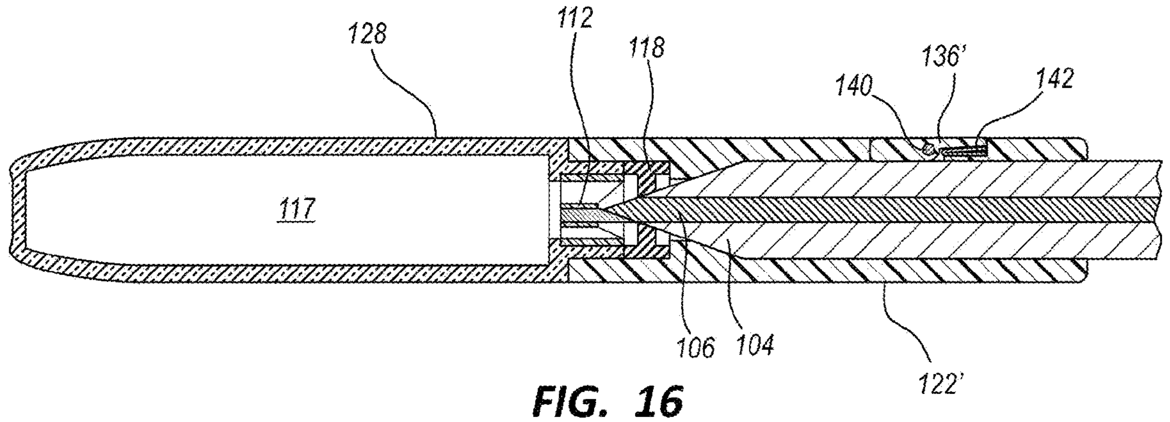
Figure 17:
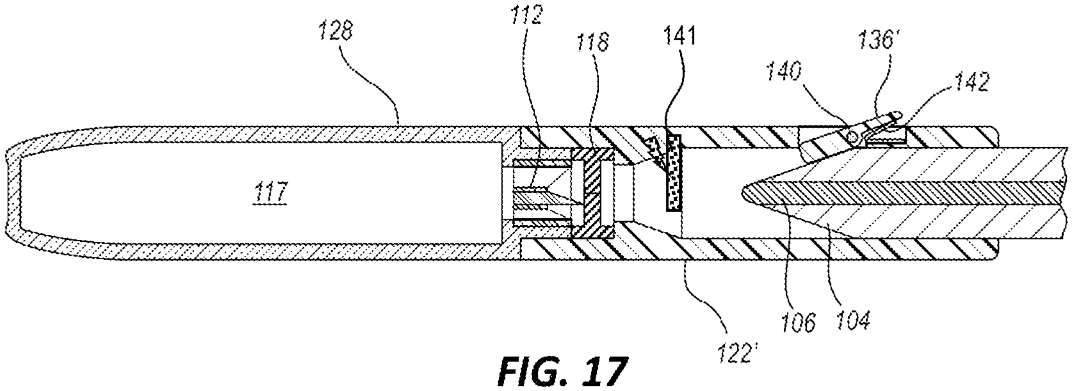
Figure 18:
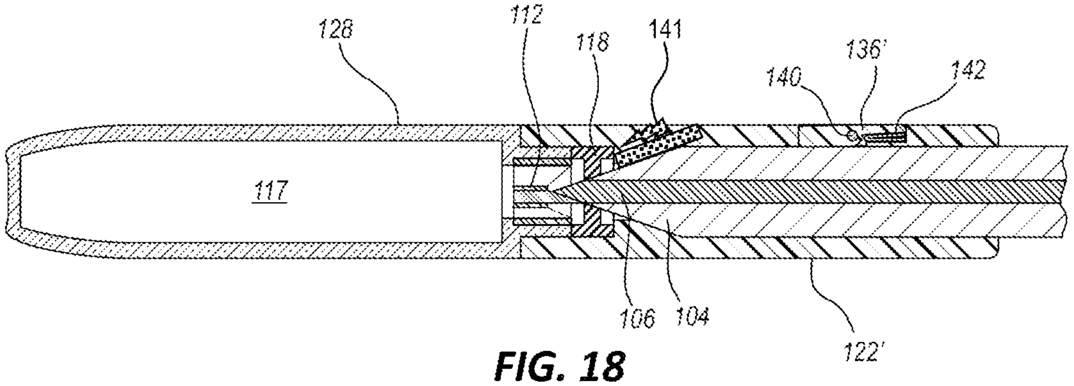

FIGS. 11-13 and 14-16 illustrate how the cap may be configured to provide two distinct and different positions for the pencil body 102 receivable therein. For example, in a first position (FIGS. 11 and 12), the pencil body 102 is inserted to a first position in cap 110', which is simply a capping position, where the first end 108*a* is covered by cap 110', but in which first end 108*a* is not received within built-in sharpener 112, so that sharpening of first end 108*a* is not possible in such a capping position. A second position is also possible (FIGS. 11 and 13), e.g., by pressing pencil body 102 further into cap 110'. As shown in FIGS. 12 and 13, cap 110' may include a biasing member 136 which provides resistance against further insertion of pencil body 102 into cap 110', once the biasing member 136 is engaged by advancing pencil body 102. For example, in the position shown in FIG. 12, member 136 may engage against the sloped surface of the tip of pencil body 102, providing resistance against further insertion, and providing tactile "feedback" to the user that the pencil tip has in fact been inserted to the "capping position". By continuing to apply additional insertion force, the user may press past such member 136, causing it to retract out of the path of pencil body 102, as shown in FIG. 13, to reach the sharpening position shown in FIG. 13, where engagement with sharpener 112 is provided, and the first end 108*a* can be sharpened as described herein. Such a biasing member 136 could include a living hinge type structure, e.g., integrally molded with cap portion 122, but which is movable about such a living hinge mechanism 138, as seen in FIGS. 11-12.

FIGS. 14-18 illustrate another configuration for cap 110", operating on a similar principle, where the member 136' may be biased (e.g., by a pin 140 and a spring 142), so as to provide tactile and/or audible (e.g., a click) feedback to a user, when the member 136' engages pencil body 102, but which can be pushed aside upon application of sufficient force, pressing through from the first "capping position" to the second "sharpening position". It will be apparent that various other configurations (e.g., grooves configured to receive a détente, etc.) are also possible, which can provide two such positions (a capping position and a sharpening position) to the user. In an embodiment, engagement of the cap in either or both such positions may be accompanied by a tactile or audible (e.g., click) que, further confirming to the user that the desired position has been achieved.

In an embodiment, any of the configurations shown in FIG. 11-13 or 14-18 (or another) may include a biasing mechanism included within the pencil body or the disposable cap, so as to ensure that the cap automatically returns to the first, capping position when the additional pressure needed to move from the first to the second position has been removed. For example, in such a configuration, the user may be required to continue to push the pencil body 102 into the cap while sharpening, in order to maintain the pencil body in the sharpening position. For example, a spring 141 (FIGS. 17-18) or other mechanism within opening 124 could engage with pencil body 102 (e.g., at first end 108*a*), pushing it back towards the first "capping position" as soon as the user releases pressure that was applied to advance pencil body 102 into the second "sharpening" position.

Following are some further example embodiments of the invention. These are presented only by way of example and are not intended to limit the scope of the invention in any way. Further, any example embodiment can be combined with one or more of the example embodiments.

Embodiment 1. A pencil device includes a body and a disposable cap. The body includes an exterior casing and a pigment core surrounded by the exterior casing. The body includes a first end at which the pigment core is exposed and a second opposite end. The disposable cap is selectively positionable so as to cover the first end of the body. the disposable cap includes (1) a proximal end body portion having an opening, (2) an opposite distal body portion having a storage cavity; (3) a built-in sharpener fixed between the proximal end body portion and the opposite distal body portion, and (4) a biasing member coupled to a sidewall of the proximal end body portion configured to switch the disposable cap between a capping position and a sharpening position. Additional pressure is required to push the disposable cap from the capping position to the sharpening position. Upon releasing of the additional pressure, the disposable cap automatically returns to the capping position from the sharpening position.

Embodiment 2. The pencil device of embodiment 1, wherein the pigment core includes a cosmetic pigment composition.

Embodiment 3. The pencil device of any of embodiments 1-2, wherein the pencil device is configured as a cosmetic eyebrow pencil, and the pigment core includes a cosmetic pigment composition.

Embodiment 4. The pencil device of any of embodiments 1-3, wherein the pigment core includes a semi-solid cosmetic pigment composition.

Embodiment 5. The pencil device of any of embodiments 1-4, wherein the pigment core is multi-colored.

Embodiment 6. The pencil device of any of embodiments 1-5, wherein the pigment core is solid, and is bonded to the exterior casing.

Embodiment 7. The pencil device of any of embodiments 1-6, wherein the first end is tapered to a point.

Embodiment 8. The pencil device of any of embodiments 1-7, wherein the body is cylindrical, and the disposable cap is also cylindrical and configured to receive the first end of the body. the first end is sharpened by rotatably twisting the cylindrical body in relation to the cylindrical cap while the first end of the cylindrical body is received within the cylindrical cap.

Embodiment 9. The pencil device of any of embodiments 1-8, wherein the pigment core is configured to change part-way through the cylindrical body, and the pigment core is exposed at both the first end and the second end so that the pigment core at the second end provides a different colored pigment as compared to the colored pigment provided at the first end.

Embodiment 9. The pencil device of any embodiments 1-8, wherein the pigment core is configured to change part-way through the cylindrical body, and the pigment core is exposed at both the first end and the second end so that the pigment core at the second provides a different colored pigment as compared to the colored pigment provided at the first end.

Embodiment 10. The pencil device of any embodiments 1-9, wherein the device comprises two caps, one over the first end and one over the second end.

Embodiment 11. The pencil device of any embodiments 1-10, wherein the body has a polygonal cross section.

Embodiment 12. The pencil device of any embodiments 1-11, wherein the storage cavity of the cap is sized to hold all shavings produced by the body throughout a lifespan of the body, and the storage cavity is sealed within the disposable cap, such that emptying the storage cavity of shavings is not possible.

Embodiment 13. The pencil device of any embodiments 1-12, wherein the body is sharpened by rotatably twisting the body in relation to the cap while the cap is in the sharpening position.

Embodiment 14. A disposable pencil cap is configured to be selectively positionable to cover an end of a pencil. The disposable pencil cap includes (1) a proximal end body portion having an opening, (2) an opposite distal body portion having a storage cavity, (3) a built-in sharpener fixed between the proximal end body portion and the opposite distal body portion, and (4) a biasing member coupled to a sidewall of the proximal end body portion configured to switch the disposable cap between a capping position and a sharpening position. An additional pressure is required to push the disposable cap from the capping position to the sharpening position. Upon release of the additional pressure, the disposable cap automatically returns to the capping position from the sharpening position.

Embodiment 15. The disposable pencil of embodiment 14, wherein the end of the pencil is sharpened by rotatably twisting the pencil in relation to the cap while the cap is in the sharpening position.

Embodiment 16. The disposable pencil of embodiment 14, wherein the storage cavity of the disposable cap is sized to hold all shavings produced by the pencil throughout a lifespan of the pencil, and the storage cavity is sealed within the disposable cap, such that emptying the storage cavity of shavings is not possible.

Embodiment 17. A method for using a disposable cosmetic pencil device includes providing a disposable cosmetic pencil and providing a disposable cap that is selectively positionable so as to cover an end of the disposable cosmetic pencil. The disposable cap includes (1) a proximal end body portion having an opening, (2) an opposite distal body portion having a storage cavity; (3) a built-in sharpener fixed between the proximal end body portion and the opposite distal body portion, and (4) a biasing member coupled to a sidewall of the proximal end body portion configured to switch the disposable cap between a capping position and a sharpening position. The method further includes applying an additional pressure after achieving the capping position, to move the disposable cap from the capping position to the sharpening position, and removing such additional pressure used to achieve the sharpening position, causing the disposable cap to revert from the sharpening position to the capping position.

Embodiment 18. The method of embodiment 17, wherein the disposable cosmetic pencil is configured as a cosmetic eyebrow pencil, and the pigment core includes a cosmetic pigment composition.

Embodiment 19. The method of embodiment 17, wherein the disposable cosmetic pencil includes a single body, and the single body includes an exterior casing, and a pigment core surrounded by the exterior casing.

Embodiment 20, The method of any of embodiments 18-19, the method further comprising disposing of any remaining portion of the disposable cosmetic pencil and the disposable cap filled with shavings from sharpening the disposable cosmetic pencil after a useful life of the disposable cosmetic pencil.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A pencil device comprising:
   a body including:
      an exterior casing; and
      an interior pigment core surrounded by the exterior casing;
      wherein the body includes a first end at which the pigment core is exposed and a second opposite end; and
   a disposable cap that is selectively positionable so as to cover the first end of the body, the disposable cap including:
      a proximal end body portion having an opening;
      an opposite distal body portion having a storage cavity; and
      a built-in sharpener fixed between a distal end of the proximal end body portion and a proximal end of the opposite distal body portion;
      a biasing member coupled to a sidewall of the proximal end body portion configured to switch the disposable pencil cap between a capping position and a sharpening position,
      wherein additional pressure is required to push the disposable pencil cap from the capping position to the sharpening position, and
      wherein upon release of the additional pressure, the disposable pencil cap automatically returns to the capping position from the sharpening position;
      wherein the opening of the proximal end body portion communicates with the storage cavity of the opposite distal body portion,
      wherein the opening of the proximal end body portion is aligned with an inlet of the built-in sharpener, and the storage cavity of the opposite distal body portion is aligned with an outlet of the built-in sharpener for receiving shavings shaved from the body during sharpening, such that shavings generated by the built-in sharpener are received through the opening, and into the storage cavity, and
   wherein the storage cavity is sealed, for permanent storage of the shavings, preventing any exit thereof, until eventual disposal with the disposable cap with the shavings sealed therein.

2. The pencil device of claim 1, wherein the pigment core comprises a cosmetic pigment composition.

3. The pencil device of claim 1, wherein the pencil device is configured as a cosmetic eyebrow pencil, and the pigment core comprises a cosmetic pigment composition.

4. The pencil device of claim 3, wherein the pigment core comprises a semi-solid cosmetic pigment composition.

5. The pencil device of claim 4, wherein the pigment core is multi-colored.

6. The pencil device of claim 1, wherein the pigment core is solid, and is bonded to the exterior casing.

7. The pencil device of claim 1, wherein the first end is tapered to a point.

8. The pencil device of claim 1, wherein the body is cylindrical, and the disposable cap is also cylindrical, configured to receive the first end of the body, and
   wherein the first end is sharpened by rotatably twisting the body in relation to the disposable cap while the first end of the body is received within the disposable cap.

9. The pencil device of claim 8, wherein the pigment core is configured to change part-way through the body, and the pigment core is exposed at both the first end and the second end so that the pigment core at the first end provides a first colored pigment, and the pigment core at the second end provides a second colored pigment.

10. The pencil device of claim 9, wherein the pencil device comprises two caps, one over the first end and one over the second end.

11. The pencil device of claim 1, wherein the body has a polygonal cross section.

12. The pencil device of claim 1, wherein the storage cavity of the disposable cap is sized to hold all shavings produced by the body throughout a lifespan of the body, and the storage cavity is sealed within the disposable cap, such that emptying the storage cavity of shavings is not possible.

13. The device of claim 1, wherein:

when the disposable cap is in the capping position, the first end of the body is covered by the cap, but the biasing member prevents the first end of the body from being received within the built-in sharpener of the disposable cap, so that sharpening of the first end of the body is not possible in the capping position.

14. The pencil device of claim 13, wherein when the disposable cap is in the sharpening position, the biasing member allows the first end of the body to be received within the built-in sharpener of the disposable cap, allowing a user to sharpen the first end of the body to a point.

15. The pencil device of claim 1, wherein the body is sharpened by rotatably twisting the body in relation to the disposable cap while the disposable cap is in the sharpening position.

16. A disposable cosmetic pencil device comprising:

a cylindrical pencil body including:

a cylindrical exterior casing; and an interior pigment core comprising a cosmetic pigment composition surrounded by the exterior casing;

wherein the cylindrical pencil body includes a first end at which the pigment core is exposed, and a second opposite end; and a disposable cap that is selectively positionable so as to cover the first end of the body, the disposable cap including:

a proximal end body portion having an opening;

an opposite distal body portion having a storage cavity;

a built-in sharpener fixed between a distal end of the proximal end body portion and a proximal end of the opposite distal body portion; and a biasing member coupled to a sidewall of the proximal end body portion configured to switch the disposable cap between a capping position and a sharpening position, wherein additional pressure is required to push the disposable pencil cap from the capping position to the sharpening position, and wherein upon release of the additional pressure, the disposable pencil cap automatically returns to the capping position from the sharpening position;

wherein the opening of the proximal end body portion communicates with the storage cavity of the opposite distal body portion, wherein the opening of the proximal end body portion is aligned with an inlet of the built-in sharpener, and the storage cavity of the opposite distal body portion is aligned with an outlet of the built-in sharpener for receiving shavings shaved from the cylindrical pencil body during sharpening, such that shavings generated by the built-in sharpener are received through the opening, and into the storage cavity, for permanent storage of the shavings, and disposal with the disposable cap, and wherein emptying of shavings within the storage cavity is not possible as the storage cavity is sealed for permanent storage of the shavings, preventing any exit thereof, the storage cavity being sized to hold all shavings produced by the device throughout a lifespan of the cylindrical pencil body, after which any remaining portion of the disposable cosmetic pencil device and disposable cap are disposed of, with the shavings sealed in the storage cavity;

wherein:

(i) when the disposable cap is in the capping position, the first end of the cylindrical pencil body is covered by the cap, but the biasing member prevents the first end of the cylindrical pencil body from being received within the built-in sharpener of the cap, so that sharpening of the first end of the cylindrical pencil body is not possible in the capping position; and (ii) when the disposable cap is in the sharpening position, the biasing member allows the first end of the cylindrical pencil body to be received within the built-in sharpener of the cap, allowing a user to sharpen the first end of the cylindrical pencil body to a point.

17. A disposable pencil cap configured to be selectively positionable to cover an end of a pencil, the disposable pencil cap comprising:

a proximal end body portion having an opening;

an opposite distal body portion having a storage cavity;

a built-in sharpener fixed between the proximal end body portion and the opposite distal body portion; and a biasing member coupled to a sidewall of the proximal end body portion configured to switch the disposable pencil cap between a capping position and a sharpening position, wherein additional pressure is required to push the disposable pencil cap from the capping position to the sharpening position, and wherein upon release of the additional pressure, the disposable pencil cap automatically returns to the capping position from the sharpening position.

18. A pencil device comprising:

a body including:

an exterior casing; and a pigment core surrounded by the exterior casing;

wherein the body includes a first end at which the pigment core is exposed and an opposite second end; and the disposable pencil cap as recited in claim 17, the cap being selectively positionable so as to cover the first end of the body.

* * * * *